United States Patent
Kitazawa et al.

(10) Patent No.: US 7,710,977 B2
(45) Date of Patent: May 4, 2010

(54) ALLOCATION OF RADIO RESOURCES TO PACKETS IN ACCORDANCE WITH SERVICE QUALITIES UNDER RADIO COMMUNICATION ENVIRONMENT

(75) Inventors: Daisuke Kitazawa, Yokohama (JP); Lan Chen, Yokohama (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1785 days.

(21) Appl. No.: 10/378,894

(22) Filed: Mar. 5, 2003

(65) Prior Publication Data

US 2003/0169746 A1 Sep. 11, 2003

(30) Foreign Application Priority Data

Mar. 6, 2002 (JP) ............................. 2002-060726

(51) Int. Cl.
*H04J 1/02* (2006.01)
(52) U.S. Cl. .................. 370/395.42; 370/329; 370/392; 370/395.1; 370/395.5; 370/395.51
(58) Field of Classification Search ................. 370/329, 370/332, 338, 392, 395.43, 395.1, 395.5, 370/395.51; 709/249, 223, 226
See application file for complete search history.

(56) References Cited

U.S. PATENT DOCUMENTS

| | | | | |
|---|---|---|---|---|
| 5,566,175 A | * | 10/1996 | Davis | 370/468 |
| 6,005,852 A | * | 12/1999 | Kokko et al. | 370/329 |
| 6,104,700 A | * | 8/2000 | Haddock et al. | 370/235 |
| 6,229,795 B1 | * | 5/2001 | Pankaj et al. | 370/329 |
| 6,335,922 B1 | | 1/2002 | Tiedemann, Jr. et al. | |
| 6,347,083 B1 | * | 2/2002 | Nishino | 370/342 |
| 6,374,117 B1 | * | 4/2002 | Denkert et al. | 455/522 |
| 6,393,012 B1 | * | 5/2002 | Pankaj | 370/342 |
| 6,442,139 B1 | * | 8/2002 | Hosein | 370/236 |
| 6,469,991 B1 | * | 10/2002 | Chuah | 370/329 |
| 6,519,461 B1 | * | 2/2003 | Andersson et al. | 455/453 |
| 6,590,890 B1 | * | 7/2003 | Stolyar et al. | 370/349 |
| 6,594,845 B1 | * | 7/2003 | Hyatt et al. | 15/88 |
| 6,606,311 B1 | * | 8/2003 | Wang et al. | 370/338 |

(Continued)

FOREIGN PATENT DOCUMENTS

EP  1 119 213  7/2001

(Continued)

*Primary Examiner*—Ayaz R Sheikh
*Assistant Examiner*—Andrew C Lee
(74) *Attorney, Agent, or Firm*—Oblon, Spivak, McClelland, Maier & Neustadt, L.L.P.

(57) ABSTRACT

A mobile communications base station has a service quality detection unit that monitors and measures communication qualities of wireless terminals currently located in the service area, and a packet classification unit that classifies packets addressed to the wireless terminals into two or more groups based on the measured communication qualities. The base station also has a buffering delay measuring unit that measures buffering delay of the packets for each of the groups. A transmission priority detection unit of the base station determines the order of priority for transmitting the packets based on the measured buffering delay in comparison with a prescribed threshold value. A resource allocation unit of the base station allocates the radio resources to the packets based on the order of priority to transmit the packets to the associated wireless terminals.

14 Claims, 10 Drawing Sheets

U.S. PATENT DOCUMENTS

| | | | |
|---|---|---|---|
| 6,671,511 B1* | 12/2003 | Forssell et al. | 455/452.1 |
| 6,687,226 B1* | 2/2004 | Galyas | 370/231 |
| 6,697,378 B1* | 2/2004 | Patel | 370/468 |
| 6,771,618 B1* | 8/2004 | Ueda | 370/329 |
| 6,781,972 B1* | 8/2004 | Anderlind et al. | 370/329 |
| 6,807,426 B2* | 10/2004 | Pankaj | 455/453 |
| 6,845,100 B1* | 1/2005 | Rinne | 370/395.43 |
| 6,865,185 B1* | 3/2005 | Patel et al. | 370/412 |
| 6,967,921 B1* | 11/2005 | Levy et al. | 370/230.1 |
| 6,978,144 B1* | 12/2005 | Choksi | 455/452.2 |
| 6,993,006 B2* | 1/2006 | Pankaj | 370/342 |
| 7,027,415 B1* | 4/2006 | Dahlby et al. | 370/322 |
| 7,089,017 B2* | 8/2006 | Chen et al. | 455/453 |
| 7,158,504 B2* | 1/2007 | Kadaba et al. | 370/348 |
| 7,233,602 B2* | 6/2007 | Chen et al. | 370/445 |
| 2002/0082033 A1* | 6/2002 | Lohtia et al. | 455/517 |
| 2002/0099854 A1* | 7/2002 | Jorgensen | 709/249 |
| 2003/0039237 A1* | 2/2003 | Forslow | 370/352 |
| 2003/0139186 A1* | 7/2003 | Igarashi et al. | 455/438 |
| 2003/0161325 A1* | 8/2003 | Kekki | 370/395.43 |
| 2003/0198204 A1* | 10/2003 | Taneja et al. | 370/332 |
| 2004/0013089 A1* | 1/2004 | Taneja et al. | 370/235 |
| 2004/0076191 A1* | 4/2004 | Sundqvist et al. | 370/516 |
| 2004/0097191 A1* | 5/2004 | Meyer et al. | 455/11.1 |

FOREIGN PATENT DOCUMENTS

| | | |
|---|---|---|
| EP | 1 154 667 | 11/2001 |
| JP | 2000-69548 | 3/2000 |
| WO | WO 98/16036 | 4/1998 |

* cited by examiner

FIG.1

| TRAFFIC TYPE | DSCP | PRIORITY | TRANSMISSION TIMING |
|---|---|---|---|
| EF (Expedited Forwarding) | 101110 | Top Priority | Real-time (Voice) |
| AF (Assured Forwarding) | XXXYY0 | Next to EF | AF4: Real-time (Video)<br>AF1-3: Non-real-time |
| BE (Best Effort) | 000000 | Same as routers that do not support Diffserv | Non-real-time |

ALLOCATION OF RADIO RESOURCES TO PACKETS IN ACCORDANCE WITH SERVICE QUALITIES UNDER RADIO COMMUNICATION ENVIRONMENT

BACKGROUND OF THE INVENTION

1. Field of the Invention

The present invention generally relates to a radio communications system for carrying out packet transmission, and more particularly, to a technique of allocation of radio resources to a downlink packet, in compliance with the service quality of the wireless terminal.

2. Description of Related Art

It is indispensable for a wireless communications system aiming to realize multimedia services to appropriately control packet transmission, taking into account the quality of services (QoS) that differs among applications. In addition, it is expected in the future wireless communications systems that information will be transmitted as packets through the network having wireless links. One technique for supporting a wide variety of service qualities required in a packet wireless communications system is to classify the packets in accordance with the service qualities required by the respective wireless terminals, and to determine the transmission priority for the packets based on the classification.

One known classification method is to set the packet transmission rate to one of the prescribed rates, such as CBR (constant bit rate), VBR (variable bit rate), or ABR (available bit rate) in the ATM (Asynchronous Transfer Mode). Another technique is to use the Diffserv architecture proposed by the IETF (Internet Engineering Task Force). Under the Diffserv architecture, the traffic type is roughly classified into EF (expedited Forwarding), AF (assured forwarding) 1, AF2, AF3, AF4, and BE (best effort). A DSCP (Diffserv code point) value representing the identifier of the QoS class is assigned to each of the traffic types. Based on this classification, a packet is grouped into one of the traffic types in accordance with the service quality required for that packet.

Figure 1:
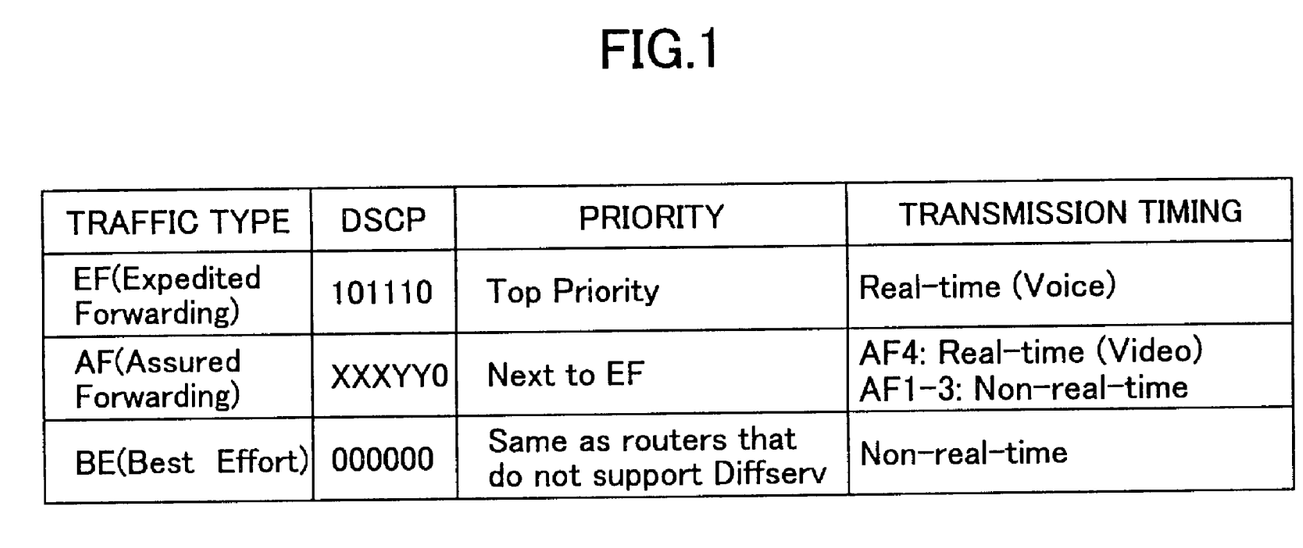
FIG. 1 illustrates the relation between traffic types and transmission priority in the Diffserv architecture.

FIG. 1 is a table defining the relation between the traffic types and the transmission priority under the Diffserv architecture. The top priority in data transmission is given to the EF (expedited forwarding) class. The EF class is used for the packet requiring real-time transmission, such as voice. The AF class has the priority next to the EF class, and weighted by four different factors. AF4 class is used for the packet containing video data that requires real-time transmission, such as video conference or streaming. AF1 through AF3 are applied to packets that do not contain data requiring real-time transmission. BE class is at the same priority level as the router that does not support the Diffserv architecture. The BE class is used to the packets containing data that do not require real-time transmission.

An identifier representing the QoS is written in advance in the prescribed field of the header of a packet or a cell. Based on this identifier, a packet transmission control apparatus classifies the packet in accordance with the required service quality, and carries out transmission priority control when forwarding the packet to the destination. For example, since in the Diffserv architecture the top priority is given to the EF class, a packet of the EF traffic type is treated with the top priority.

However, the above-described method may not exhibit its effect efficiently, depending on the environment, if it is applied to radio communications as it is. In other words, even though the packet transmission control apparatus classifies the packets into groups and controls the order of transmission priority based on the required service qualities, a receiver or destination equipment may not receive the exact service quality that the destination equipment requires.

Figure 2:
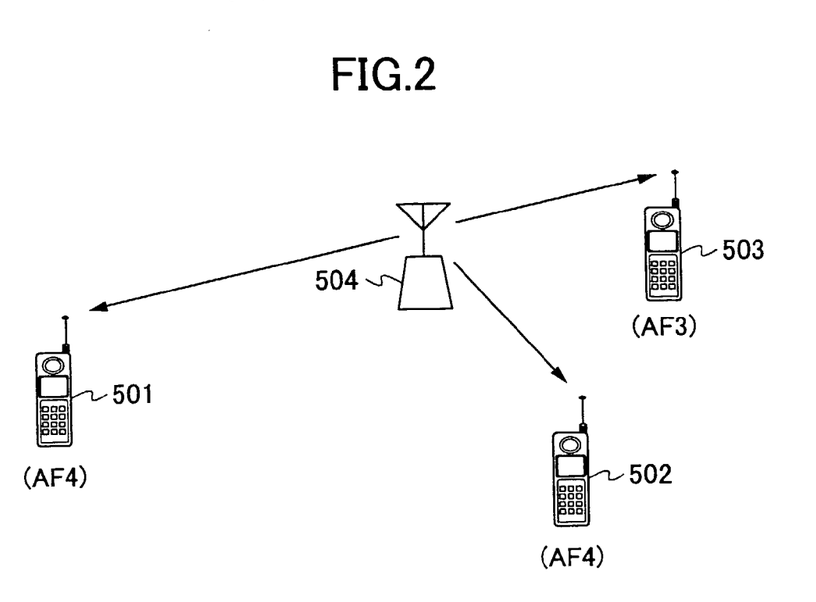
FIG. 2 illustrates an example of a conventional mobile communications system employing the Diffserv architecture.

FIG. 2 illustrates an example of the radio communication system. The mobile communications system shown in FIG. 2 includes a base station 504, which functions as a packet transmission control apparatus, and three wireless terminals 501, 502, and 503, which function as receivers or destination equipment. The wireless terminals 501 and 502 are installed with an application corresponding to traffic type AF4, and wireless terminal 503 is installed with an application corresponding to traffic type AF3 in the Diffserv architecture.

The base station 504 has FIFO (First-In First Out) transmission buffers for the respective traffic types. When receiving a packet, the base station 504 stores the packet in the associated transmission buffer corresponding to the traffic type of the addressed terminal one by one in order of arrival. Then, the base station 504 assigns radio resourced to the packet stored in the buffer and transmits it to the destination.

However, under the radio communication environment, the locations (or the circumstances) of the wireless terminals differ from one other, while each location moves frequently as time passes. In addition, the transmission conditions, such as path conditions or interference, often change. Accordingly, the quantity of radio resources required for the packet transmission also fluctuates as time passes.

For example, it is assumed that the radio resource to be allocated is transmission power of the base station 504, and that the transmission power is allocated to AF3 and AF4 classes so that the transmission ratio, that is, the ratio of the number of packets of AF3 to the number of packets of AF4, becomes four to two (4/2).

Figure 3:
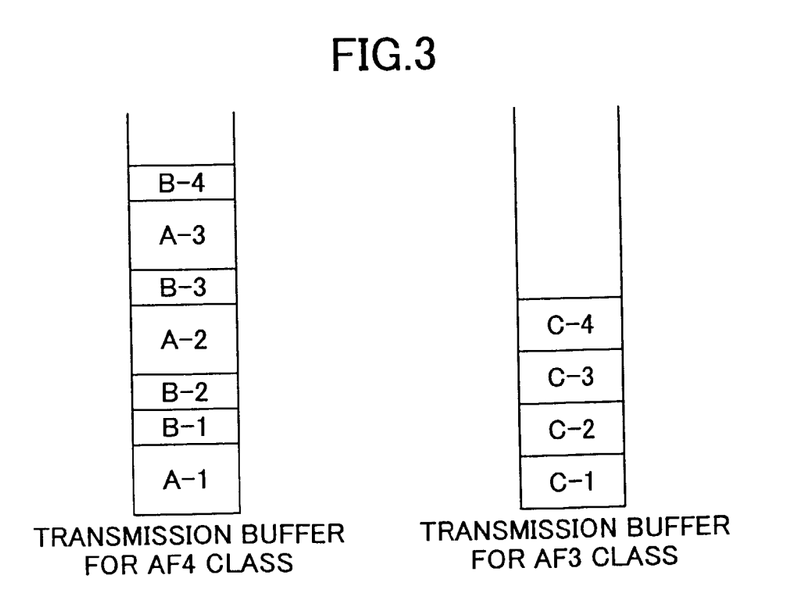
FIG. 3 illustrates an example of transmission buffers storing packets in accordance with the class of the Diffserv architecture.

As illustrated in FIG. 3, the transmission buffer for AF4 class stores packets A-1 through A-3 addressed to wireless terminal 501, which correspond to two AF4-class fields, and packets B-1 through B-4 addressed to wireless terminal 502, which also correspond to two AF4-class fields. The packets are stored in order of arrival of the packets. In this example, AF4 packets are received at the base station 504 in order of A-1, B-1, B-2, A-2, B-3, A-3, B-4. On the other hand, the transmission buffer for AF3 class stores packets C-1 through C-4, which correspond to two AF3-class fields. The arrival order of these AF3 packets is C-1, C-2, C-3, and C-4. The vertical length of the packets shown in FIG. 3 represents the transmission power required to transmit these packets to the destinations.

Figure 4:
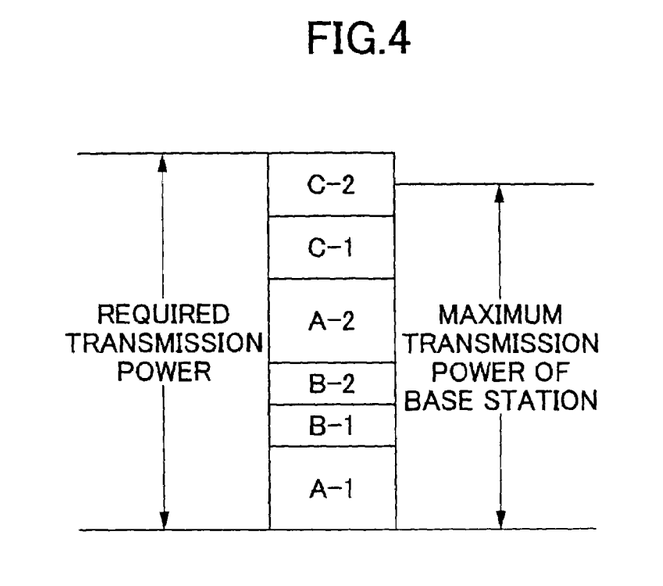
FIG. 4 illustrates the relation between the transmission power required for packet transmission and the maximum transmission power of the base station.

Based on the transmission ratio and the arrival order, the base station 504 tries to assign transmission power to packets A-1, B-1, B-2, A-2, C-1, and C-2, simultaneously. However, as illustrated in FIG. 4, the required transmission power levels simultaneously assigned to these packets exceeds the maximum transmission power level of the base station 504. A portion of the packets (in this example, packet C-2) cannot receive the necessary power, and consequently, transmission delay occurs, whereby the predetermined transmission ratio cannot be maintained. In other words, the required service quality cannot be satisfied. For this reason, it becomes important for priority transmission control to allocate radio resources in a reliable manner, taking into account changes in transmission paths, interference, and other factors under the radio communications environment.

In addition, since the radio resources, such as time slots, frequency bands, spreading codes, or transmission power, are limited, it is also important to use the finite radio resources efficiently.

BRIEF SUMMARY OF THE INVENTION

The present invention is conceived to overcome the above-described problems, and it is an object of the invention to provide a technique of efficient allocation of radio resources, while satisfying the service quality required for a wireless terminal in packet transmission. This resource allocation technique is applicable to a conventional system, such as the Diffserv system, that carries out packet classification and transmission priority control.

To achieve the object, in one aspect of the invention, a method for allocating radio resources to packets addressed to a plurality of wireless terminals is provided. This method is carried out at a base station in a radio communications system. In the method, (a) a threshold of buffering delay is set at the base station;

(b) the communication qualities of the wireless terminals located in the service area of the base station are monitored;

(c) the packets addressed to the wireless terminals are classified into two or more groups based on the communication qualities of the wireless terminals;

(d) buffering delay of the packet is measured in each of the groups; and (e) if there is a group that includes a packet with the buffering delay at or above the threshold, priority for allocating the radio resources is given to the packets belonging to the group that includes the packet with the buffering delay at or above the threshold.

This method is effective in the congested state, where the buffering delay of packets is apt to increase at the base station over the acceptable delay time. By giving transmission priority to the packets classified in the group that includes a packet with the buffering delay over the threshold, transmission delay can be prevented, while conducting transmission control in compliance with the service quality of the wireless terminals to which the packets are addressed.

If there is not a group that includes a packet with the buffering delay at or above the threshold, the priority for allocating the radio resources is given to the packets addressed to the wireless terminals having lower communication qualities.

This arrangement can move up the total quantity of radio resources, that can be allocated to the packets toward the maximum radio resources of the base station.

Alternatively, if there is not a group that includes a packet with the buffering delay at or above the threshold, the priority for allocating the radio resources is given to the packets addressed to the wireless terminals having higher communication qualities.

This arrangement can increase the number of packets that can be transmitted with the limited quantity of radio resources.

Preferably, when allocating the radio resources, it is determined whether there is a sufficient quantity of radio resources left for a current packet. If the radio resources are insufficient for the current packet, the radio resources are allocated to another packet belonging to the same group.

In another aspect of the invention, a base station that allocates radio resources to packets addressed to wireless terminals located in the service area is provided. The base station comprises:

(a) buffering delay threshold setting unit that sets a threshold value of buffering delay at the base station;

(b) a service quality detection unit that monitors and measures communication qualities of the wireless terminals;

(c) a packet classification unit that classifies the packets into two or more groups based on the measured communication qualities of the wireless terminals;

(d) buffering delay measuring unit that measures buffering delay of the packets for each of the groups;

(e) a transmission priority determination unit that determines order of priority for transmitting the packets based on buffering delay measuring result of the buffering delay measuring unit, in comparison with the threshold; and (f) a resource allocation unit that allocates the radio resources to the packets in accordance with the order of priority.

This base station can efficiently allocate the radio resources to the packets addressed to the wireless terminals currently located in the service area, while considering the radio communication environment, such as the degree of congestion, which affects the communication quality.

If there is a group with buffering delay measuring result at or above the threshold value, the transmission priority determination unit gives transmission priority to the packets included in the group with the buffering delay measuring result at or above the threshold value. Accordingly, the resource allocation unit first allocates the radio resources to the packets included in the group with the buffering delay measuring result at or above the threshold value.

If there is not a group with buffering delay measuring result at or above the threshold value, then the transmission priority determination unit gives transmission priority to the packets included in a group corresponding to a lower communication quality. The resource allocation unit first allocates the radio resources to the packets included in the group corresponding to the lower communication quality.

Alternatively, if there is not a group with the buffering delay measuring result at or above the threshold value, the transmission priority determination unit may give transmission priority to the packets included in a group corresponding to a higher communication quality. In this case, the resource allocation unit first allocates the radio resources to the packets included in the group corresponding to the higher communication quality.

Preferably, the resource allocation unit determines whether there is sufficient quantity of radio resources available for a current packet. If the radio resources are insufficient for the current packet, the resource allocation unit allocates the radio resources to another packet belonging to the same group.

DETAILED DESCRIPTION OF THE INVENTION

Figure 5:
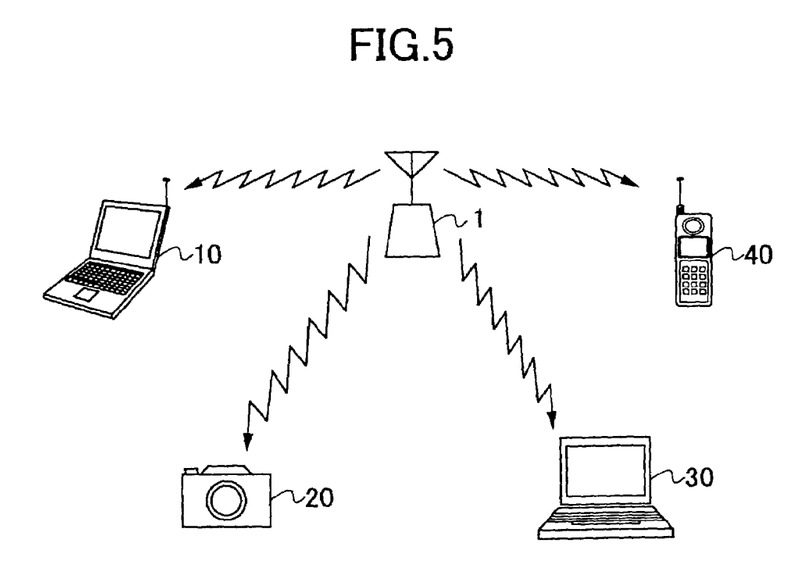
FIG. 5 illustrates an example of a radio communication system to which the present invention is applied.

The present invention will now be described in detail in conjunction with the attached drawings. FIG. 5 illustrates an example of the radio communications system to which a radio resource allocation technique of the present invention is applied.

The base station 1 covers the area in which wireless terminals 10, 20, 30, and 40 are located. These wireless terminals 10 through 40 are connected to the base station 1 via radio communications. The base station 1 allocates radio resources, such as time slots in TDMA, frequency band in FDMA, spreading codes in CDMA, and transmission power of the base station 1, to the packets addressed to the wireless terminals 10 through 40. In the following, the transmission power of the base station 1 is allocated to the packets, as an example of the radio resources.

In FIG. 5, while terminal 10 is receiving image data from the base station 1, terminal 20 is receiving control data for a camera. Similarly, terminal 30, which also function as a personal computer, is receiving data from the base station 1, and terminal 40 is making voice communication.

Figure 6:
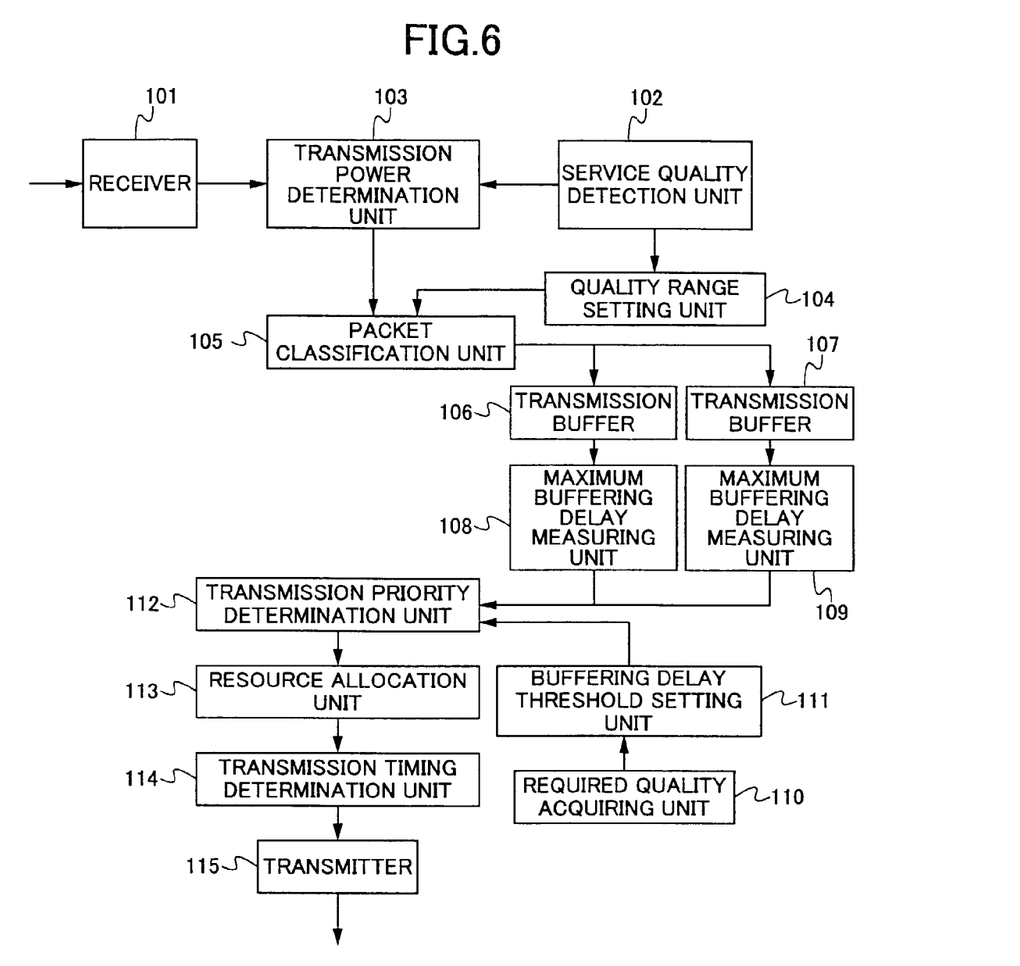
FIG. 6 illustrates the structure of a base station to which the present invention is applied.

FIG. 6 illustrates the structure of the base station 1. The base station 1 comprises a receiver 101, a service quality detection unit 102, a transmission power determination unit 103, a quality range setting unit 104, and packet classification unit 105. The base station 1 also comprises transmission buffers 106 and 107, maximum buffering delay measuring units 108 and 109, a required quality acquiring unit 110, and buffering delay threshold setting unit 111. Furthermore, the base station 1 has a transmission priority determination unit 112, a resource allocation unit 113, a transmission timing determination unit 114, and a transmitter 115. The transmission buffers 106 and 107 are of a FIFO type.

The receiver 101 receives a packet addressed to a wireless terminal located in the area, and supplies the packet to the transmission power determination unit 103. The packet contains information (such as telephone number or the IP address assigned to the wireless terminal) for identifying the destination.

The service quality detection unit 102 constantly monitors and measures the communication quality of each of the wireless terminals 10 through 40. The communication quality includes, but is not limited to, transmission power required for the base station to transmit the packet to the wireless terminal, receiving quality (such as SIR) at the wireless terminal, the receiving error rate at the wireless terminal, throughput and packet loss of the wireless terminal, etc. The service quality detection unit 102 outputs the measurement result to the transmission power determination unit 103 and to the quality range setting unit 104. The measurement result contains the identity information of the associated wireless terminal.

The transmission power determination unit 103 determines the transmission power level required to transmit the packet to the addressed wireless terminal, based on the packet supplied from the receiver 101 and the communication quality measured by the service quality detection unit 102. To be more precise, every time a packet is input to the transmission power determination unit 103 from the receiver 101, the transmission power determination unit 103 looks for the measurement result that has the same identity information as that contained in the packet. Then, the transmission power level to be allocated to this packet for transmission to the destination is determined based on the associated measurement result. For example, if the communication quality supplied from the service quality detection unit 102 is good, the transmission power determination unit 103 sets a small transmission power level for this packet. In contrast, if the communication quality is not good, the transmission power level is set larger. The transmission power determination unit 103 supplies the determined transmission power level, as well as the packet and the communication quality, to the packet classification unit 105.

The quality range setting unit 104 calculates the average of communication qualities of the wireless terminals 10 through 40, based on the output from the service quality detection unit 102, to determine the quality ranges for the transmission buffers 106 and 107. In this example, the quality range setting unit 104 sets a quality range at or above the average for transmission buffer 106, and sets a quality range below the average for transmission buffer 107. Then, the quality range setting unit 104 outputs the quality ranges determined for the transmission buffers 106 and 107 to the packet classification unit 105.

The packet classification unit 105 distributes the packet to one of the transmission buffers 106 and 107, based on the communication quality and the transmission power supplied from the transmission power determination unit 103, and on the quality ranges of the transmission buffers 106 and 107 supplied from the quality range setting unit 104.

To be more precise, every time the packet classification unit 105 receives a packet, together with the transmission power level and the communication quality, from the transmission power determination unit 103, the packet classification unit 105 determines which quality range of the transmission buffer covers the detected communication quality of the packet. Then, the packet classification unit 105 sends the packet together with the necessary transmission power level to the selected buffer.

If the communication quality output from the transmission power determination unit 103 is at or above the average of the communication qualities of the wireless terminals 10 through 40, the packet is sent to and stored in the transmission buffer 106 in association with the transmission power level determined to be suitable for the detected communication quality. If the communication quality output from the transmission power determination unit 103 is below the average, then the packet is stored in the transmission buffer 107 in association with the transmission power level corresponding to the detected communication quality. In this example, the packets are grouped into two groups, namely, a group at or above the average and a group below the average. The packets belonging to the former group are stored in the transmission buffer 106, and the packets belonging to the latter group are stored in the transmission buffer 107.

The maximum buffering delay measuring unit 108 constantly measures the buffering delay of the leading packet stored in the buffer 106. The buffering delay is the time having passed while the packet has been stored in the buffer. The measured buffering delay is output to the transmission priority determination unit 112. Similarly, the maximum buffering delay measuring unit 109 constantly measures the buffering delay of the leading packet stored in the buffer 107, and outputs the measuring result (i.e., the longest buffering delay in this buffer) to transmission priority determination unit 112.

The required quality acquiring unit 110 acquires the service qualities required for the wireless terminals 10 through 40. In this example, the required service quality is an acceptable delay time of each of the wireless terminals. The buffering delay threshold setting unit 111 sets a threshold value of the longest acceptable buffering delay of the packet in the transmission buffers 106 and 107, based on the required service qualities of the wireless terminals 10 through 40. If the required service qualities differ from among the wireless terminals 10 through 40, then the buffering delay threshold setting unit 111 selects a threshold value of the shortest acceptable buffering delay so as to satisfy the highest service quality currently required.

Based on the maximum buffering delay of the leading packet measured by the maximum buffering delay measuring unit 108 and 109, and on the threshold value determined by the buffering delay threshold setting unit 111, the transmission priority determination unit 112 determines the order of priority for transmitting the packets stored in the transmission buffers 106 and 107.

The resource allocation unit 113 reads the packets and the associated transmission power levels from the transmission buffers 106 and 107 one by one, based on the priority determined by the transmission priority determination unit 112. Then, the resource allocation unit 113 allocates the radio resources to the packet in compliance with the transmission power level determined for this packet, and supplies the packet, together with the value of the transmission power level allocated to this packet, to the transmission timing determination unit 114.

The detailed process of allocation of the radio resources carried out by the transmission priority determination unit 112 and the resource allocation unit 113 will be explained below.

The transmission timing determination unit 114 outputs the packet to the transmitter 115 at a predetermined timing. Upon receiving the packet, the transmitter 115 transmits the packet to the addressed wireless terminal (destination).

Next, explanation will be made of the allocation of the radio resources based on the first and second embodiments. In the following explanation, the transmission buffers 106 and 107 are occasionally referred to as group-1 buffer and group-2 buffer, respectively.

In the first embodiment, the transmission priority determination unit 112 checks the packets stored in the transmission buffer 106, namely, the packets addressed to the wireless terminals having communication qualities at or above the average. If the buffering delay of the leading packet (i.e., the maximum buffering delay) is equal to or longer than the threshold value of the buffering delay set by the buffering delay threshold setting unit 111, the transmission power level, which is an example of the radio resources, is allocated to the packet in the transmission buffer 106 at a higher priority. If the buffering delay of the leading packet is shorter than the threshold, then the transmission power level (or the radio resource) is allocated to the packet in the transmission buffer 107 having the communication quality below the average.

Figure 7:
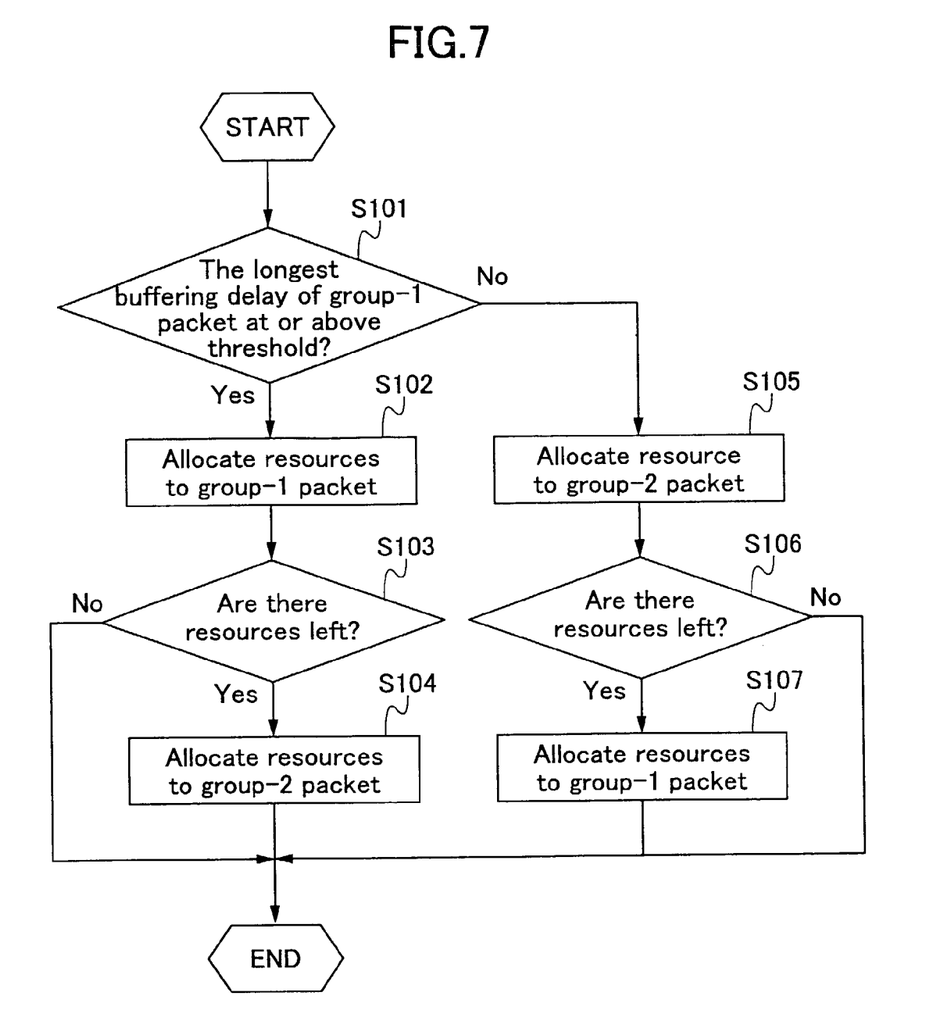
FIG. 7 illustrates the operation flow of allocation of radio resources according to the first embodiment of the invention.

FIG. 7 is a flowchart showing the operations of allocating the radio resources according to the first embodiment. The transmission priority determination unit 112 determines whether the maximum buffering delay of the packet (that is, the buffering delay of the leading packet) of group-1 buffer (transmission buffer) 106 is equal to or greater than the threshold of the buffering delay (step S101).

If the maximum buffering delay of packet in group 1 is at or above the threshold buffering delay (YES in step S101), the transmission priority determination unit 112 gives top priority to the leading packet of group 1 so that the radio resource is first allocated to this leading packet. The resource allocation unit 113 allocates the transmission power to the packet of group 1 in compliance with the determined order of priority (step S102).

Then, the resource allocation unit 113 determines whether there is a remainder resource (i.e., transmission power left by subtracting the transmission power allocated to the packet of group 1 from the maximum transmission power of the base station 1) (step S103).

If there are no more resources left (NO in step S103), the process terminates. If there are resources still left (YES in step S103), the resource allocation unit 113 allocates the resources to the packet in group 2 (the transmission buffer 107) (step S104), and the process terminates.

On the other hand, if in step S101 it is determined that the maximum buffering delay of the leading packet of group 1 is below the threshold (NO in S101), the transmission priority determination unit 112 gives priority to the packets in group 2. The resource allocation unit 113 allocates the transmission power level (i.e., the radio resource) to the packets of group 2 in compliance with the determined priority (step S105).

Then, the resource allocation unit 113 determines whether there are remaining resources (transmission power left by subtracting the transmission power level allocated to the packet of group 2 from the maximum transmission power level of the base station 1) (step S106).

If there are no more resource left (NO in step S106), the process terminates. If there are resource still left (YES in step S106), the resource allocation unit 113 allocates the resource to group-1 packets (step S107), and the process terminates.

Figure 8A:
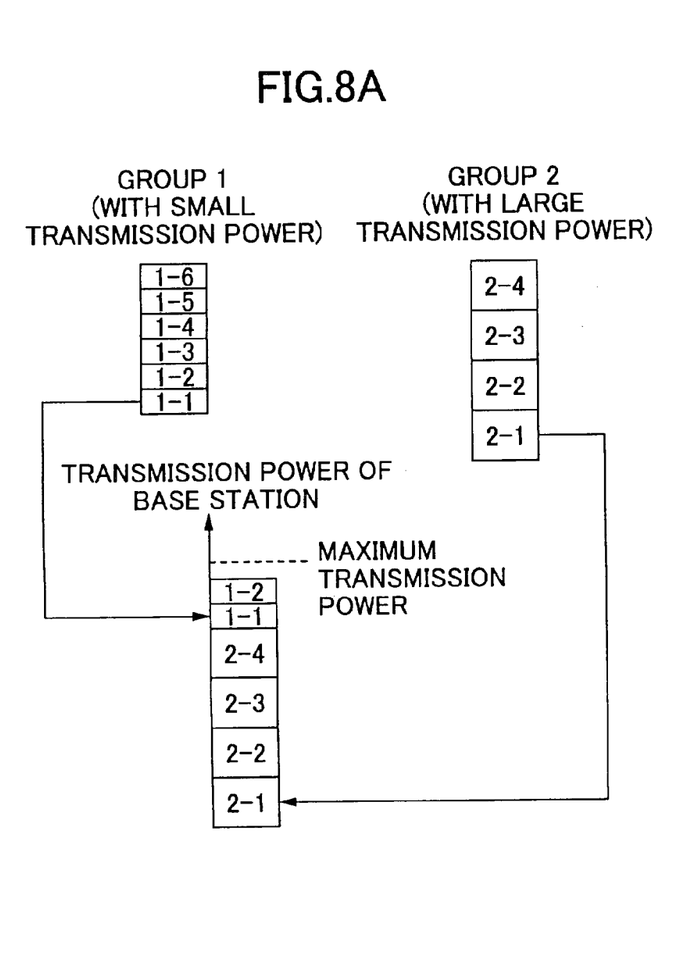
FIG. 8 illustrates the relation between the transmission power required for packet transmission and the maximum transmission power of the base station according to the first embodiment of the invention.
Figure 8B:
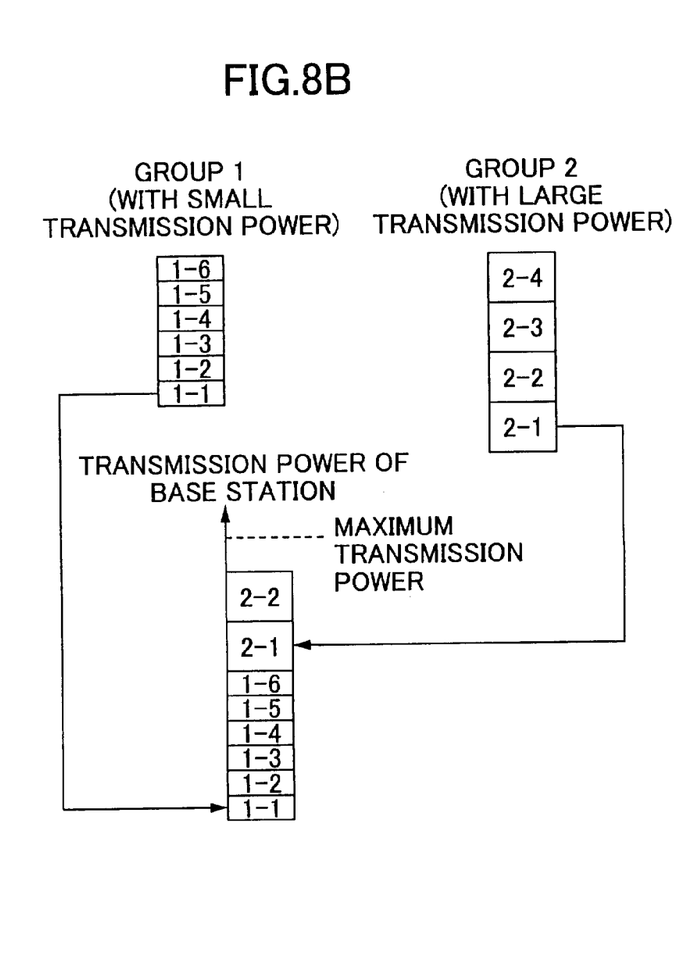

FIG. 8A and FIG. 8B illustrate the relation between the transmission power required to transmit a packet and the maximum transmission power of the base station. In these figures, packets 1-1 through 1-6 are stored in group-1 buffer, and packets 2-1 through 2-4 are stored in group-2 buffer. The length of each block (packet) in the buffer represents the level of transmission power required to transmit the packet.

If, in step S101 of FIG. 7, it is determined that the maximum buffering delay of a group-1 packet (i.e., the buffering delay of the leading packet 1-1) is below the threshold, priority is given to the group-2 packets (that require larger transmission power), and transmission power is first assigned to packets 2-1 through 2-4, as illustrated in FIG. 8A. If there is still transmission power left after the allocation to the packets 2-1 through 2-4, the remaining transmission power is assigned to group-1 packets (that require less transmission power) as long as it does not exceed the maximum transmission power level of the base station 1.

If, on the other hand, it is determined in step S101 of FIG. 7 that the maximum buffering delay of a group-1 packet is at or above the threshold, then priority is given to the group-1 packets, and transmission power is first assigned to packets 1-1 through 1-6, as illustrated in FIG. 8B. If there is transmission power left after the allocation of the transmission power to packets 1-1 through 1-6, then the remaining transmission power is assigned to group-2 packets 2-1 and 2-2 (that require greater transmission power) as long as it does not exceed the maximum transmission power level of the base station 1.

Figure 9:
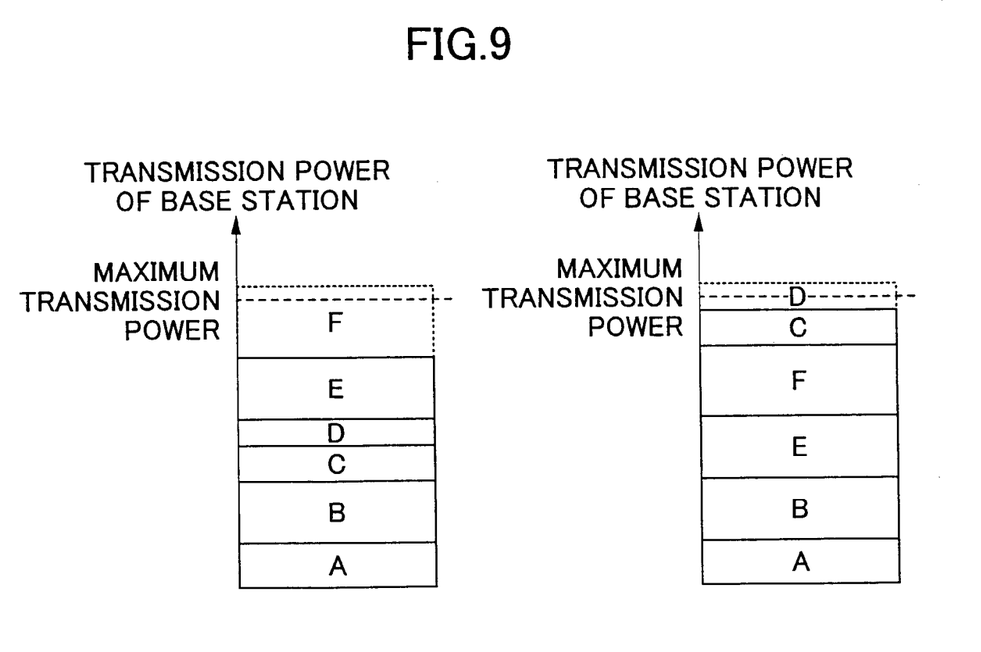
FIG. 9 illustrates the comparison between the conventional technique and the first embodiment in the relation between the transmission power required for packet transmission and the maximum transmission power of the base station.

FIG. 9 illustrates comparison between the conventional technique and the resource allocation method according to the first embodiment of the invention, regarding the relation between the transmission power required for transmission of packets and the maximum transmission power level of the base station. In the conventional method, which is shown in the left drawing of FIG. 9, transmission power, which is an example of radio resources, is allocated to packets in order of arrival of the packets (order of A, B, C, D, and E).

The resource allocation method of the present invention is shown in the right drawing, which is carried out under the situation where it is determined that the maximum buffering delay of group-1 packets is below the threshold in step S101 of FIG. 7. In this case, transmission power is allocated to group-2 packets A, B, E and F, which require greater transmission power. If there is transmission power left after the allocation to the group-2 packets, the remaining transmission power is assigned to packet C of group 1, which requires less transmission power, as long as it does not exceed the maximum transmission power level of the base station 1. With this arrangement, even if the remaining transmission power becomes small (that is, even if the total level of transmission power assigned to packets becomes close to the maximum transmission power level of the base station 1), the remaining transmission power can be still allocated to more packets that require smaller transmission power. This means that the total transmission power assigned to packets can be increased closer to the maximum transmission power level of the base station 1, and consequently, the efficiency of allocation of radio resources is improved.

In the first embodiment, base station 1 monitors and measures the time-varying communication qualities of wireless terminals 10 through 40, and classifies packets addressed to the wireless terminals 10 through 40 into two groups depending on whether the current communication quality of each terminal reaches the average in the area covered by the base station 1. The packet addressed to a wireless terminal with current communication quality at or above the average is stored in group-1 buffer 106. The packet addressed to a wireless terminal with current communication quality below the average is stored in group-2 buffer 107. In addition, the base station 1 determines the maximum buffering delay of a packet in transmission buffer 106. If the maximum buffering delay of a packet in transmission buffer 106 reaches or exceeds the threshold time, the base station 1 gives priority to the packets in group-1 buffer 106 when allocating the transmission power. If the maximum buffering delay in transmission buffer 106 is below the threshold, the base station 1 first allocates the transmission power to the packets in group-2 buffer 107.

In the congested state where the maximum buffering delay of a packet in transmission buffer 106 exceeds the threshold, the packets in transmission buffer 106 are given higher priority in allocation of transmission power. This arrangement can prevent transmission delay, and realizes transmission control in compliance with the service quality required by the wireless terminal.

In a non-congested state, packets in transmission buffer 107, which require a greater quantity of radio resources for transmission, are given higher priority in allocation of transmission power. After the allocation of transmission power to packets in the transmission buffer 107, the remaining transmission power is assigned to the packets in the transmission buffer 106, which require less radio resources for transmission. This arrangement can pull up the total level of transmission power assigned to packets toward the maximum transmission power level of the base station 1, as compared with the conventional technique, making good use of transmission power in an efficient manner.

Next, the second embodiment of resource allocation will be explained below. In the second embodiment, the transmission priority determination unit 112 checks the packets stored in the transmission buffer 107, namely, the packets addressed to the ratio terminals having communication qualities below the average. If the buffering delay of the leading packet (i.e., the maximum buffering delay) in transmission buffer 107 is equal to or greater than the threshold value set by the buffering delay threshold setting unit 111, the transmission power, which is an example of the radio resources, is allocated to the packet in the transmission buffer 107 at a higher priority. If the buffering delay of the leading packet is shorter than the threshold, then the transmission power (or the radio resource) is first allocated to the packets in the transmission buffer 106, which has a communication quality at or above the average.

Figure 10:
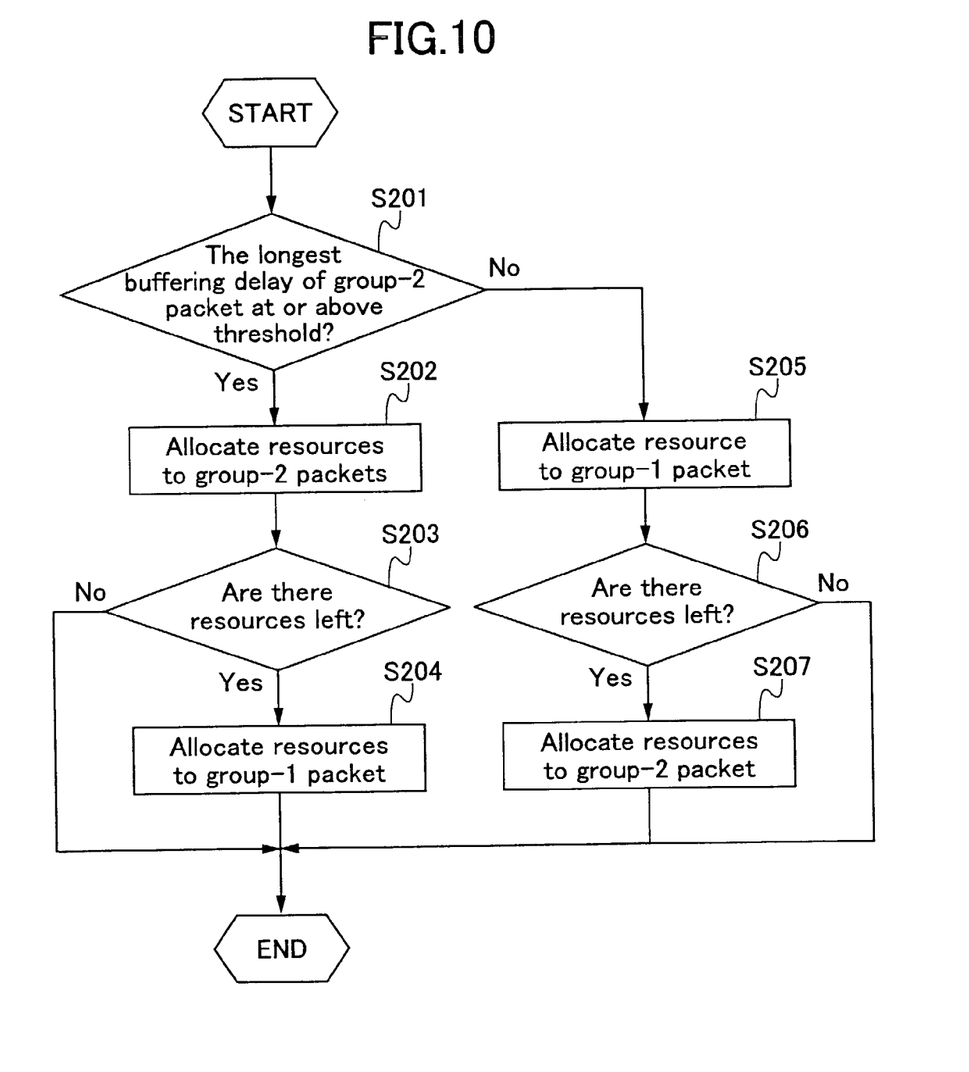
FIG. 10 illustrates the operation flow of allocation of radio resources according to the second embodiment of the invention.

FIG. 10 is a flowchart showing the operations of allocating the radio resources according to the second embodiment. The transmission priority determination unit 112 determines whether the maximum buffering delay of the packet (that is, the buffering delay of the leading packet) of group-2 buffer (transmission buffer 107) is equal to or greater than the threshold of the buffering delay (step S201).

If the maximum buffering delay of packet in group 2 is at or above the threshold buffering delay (YES in step S201), the transmission priority determination unit 112 gives priority to the leading packet of group 2 so that the radio resources are first allocated to this leading packet. The resource allocation unit 113 allocates the transmission power to the packets of group 2 in compliance with the determined order of priority (step S202).

Then, the resource allocation unit 113 determines whether there are remaining resources (i.e., transmission power left by subtracting the transmission power level allocated to the packet of group 2 from the maximum transmission power level of the base station 1) (step S203).

If there are no resources left (NO in step S203), then the process terminates. If there are resources still left (YES in step S203), the resource allocation unit 113 allocates the remaining resources to the packets in group 1 (the transmission buffer 106) (step S204), and the process terminates.

On the other hand, if in step S201 it is determined that the maximum buffering delay of the leading packet of group 2 is below the threshold (NO in S201), the transmission priority determination unit 111 gives priority to the packets in group 1. The resource allocation unit 113 allocates the transmission power (i.e., the radio resource) to the packets of group 1 in compliance with the determined priority (step S205).

Then, the resource allocation unit 113 determines whether there are remaining resources (transmission power left by subtracting the transmission power level allocated to the packet of group 1 from the maximum transmission power level of the base station 1) (step S206).

If there are no resources left (NO in step S206), then the process terminates. If there are resources still left (YES in step S206), the resource allocation unit 113 allocates the remaining resources to the group-2 packets (step S207), and the process terminates.

Figure 11A:
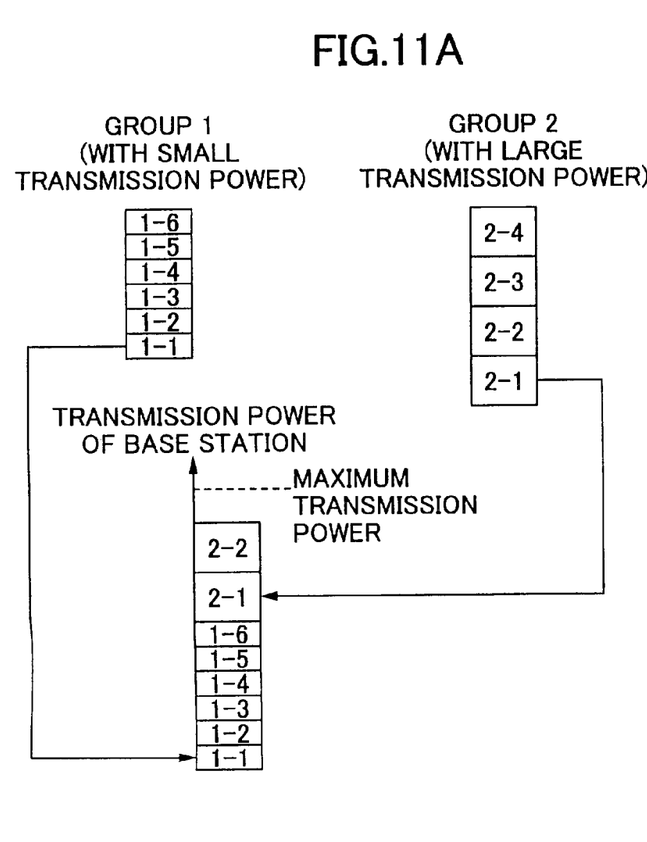
FIG. 11 illustrates the relation between the transmission power required for packet transmission and the maximum transmission power of the base station according to the second embodiment of the invention.
Figure 11B:
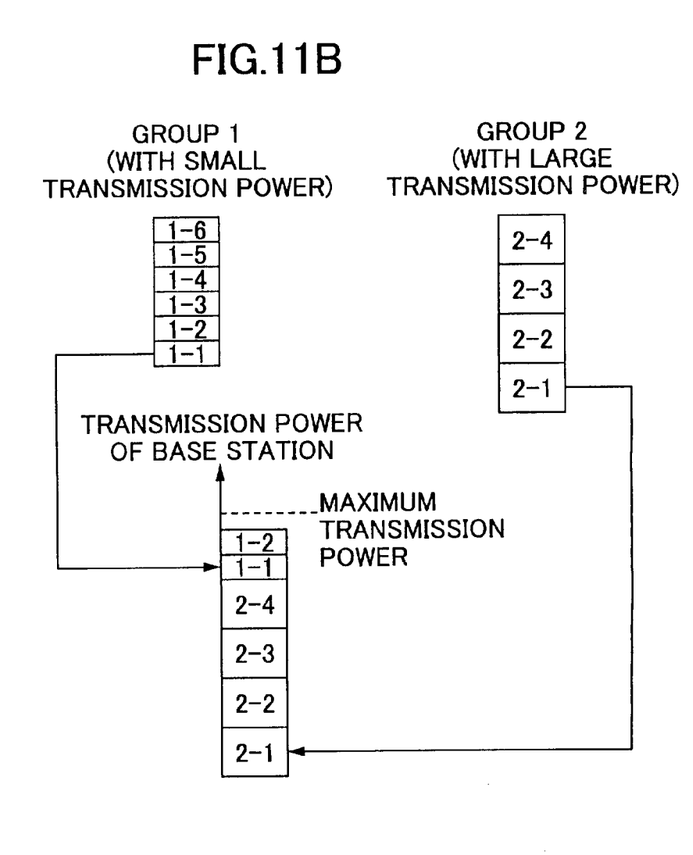

FIG. 11A and FIG. 11B illustrate the relation between the transmission power required to transmit a packet and the maximum transmission power of the base station. In these figures, packets 1-1 through 1-6 are stored in group-1 buffer, and packets 2-1 through 2-4 are stored in group-2 buffer. The length of each block (packet) in the buffer represents the level of transmission power required to transmit the packet.

If, in step S201 of FIG. 10, it is determined that the maximum buffering delay of a group-2 packet (i.e., the buffering delay of the leading packet 2-1) is below the threshold, priority is given to the group-1 packets (that require less transmission power), and transmission power is first assigned to packets 1-1 through 1-6, as illustrated in FIG. 11A. If there is still transmission power left after the allocation to the packets 1-1 through 1-6, then the remaining transmission power is assigned to group-2 packets (that require greater transmission power) as long as it does not exceed the maximum transmission power level of the base station 1.

If, on the other hand, it is determined in step S201 of FIG. 10 that the maximum buffering delay of a group-2 packet is at or above the threshold, then priority is given to the group-2 packets, and transmission power is first assigned to packets 2-1 through 2-4, as illustrated in FIG. 11B. If there is transmission power left after the allocation of the transmission power to packets 2-1 through 2-4, then the remaining transmission power is assigned to group-1 packets 1-1 and 1-2 (that require less transmission power) as long as it does not exceed the maximum transmission power level of the base station 1.

In the second embodiment, base station 1 monitors and measures the time-varying communication qualities of wireless terminals 10 through 40, and classifies packets addressed to the wireless terminals 10 through 40 into two groups depending on whether the current communication quality of each terminal reaches the average in the area covered by the base station 1. The packet addressed to a wireless terminal with current communication quality at or above the average is stored in group-1 buffer 106. The packet addressed to a wireless terminal with current communication quality below the average is stored in group-2 buffer 107. In addition, the base station 1 determines the maximum buffering delay of a packet in transmission buffer 107. If the maximum buffering delay of a packet in transmission buffer 107 reaches or exceeds the threshold time, the base station 1 gives priority to the packets in group-2 buffer 107 when allocating the transmission power. If the maximum buffering delay of a packet in transmission buffer 107 is below the threshold, the base station 1 first allocates the transmission power to the packets in group-1 buffer 106.

In the congested state where the maximum buffering delay of a packet in transmission buffer 107 exceeds the threshold, the packets in transmission buffer 107 are given higher priority in the allocation of transmission power. This arrangement can prevent transmission delay, and realizes transmission control in compliance with the service quality required by the wireless terminal.

In a non-congested state, packets in transmission buffer 106, which require less quantity of radio resources for transmission, are given higher priority in allocation of transmission power. After the allocation of transmission power to the packets in transmission buffer 106, the remaining transmission power is assigned to the packets in the transmission buffer 107, which require a greater quantity of radio resources for transmission. This arrangement can assign the transmission power to as many packets as possible. Consequently, more packets can be transmitted under the limited quantity of radio resources, and the throughput can increase. Since the transmission power is assigned to the packets requiring a greater quantity of radio resources later, improvement of the communication quality of the destination wireless terminal can be expected. If the communication quality of the wireless terminal is actually improved before the allocation of the transmission power, the level of transmission power assigned to the packet can be reduced. To this regard, the transmission power can be used even more efficiently.

In both the first and second embodiments, the base station 1 determines the quality range for the transmission buffers 106 and 107 taking into account the average of the communication qualities of various types of wireless terminals (in the embodiments, wireless terminals 10 through 40). Accordingly, the packets addressed to the wireless terminals 10 through 40 are classified evenly into two groups, and stored in the corresponding transmission buffers 106 and 107 without unevenness.

Next, the third embodiment will be described. Although some wireless terminals are classified into the same group, the communication quality of each wireless terminal varies at a certain range, and accordingly, the quantity of radio resources allocated to the packet addressed to the wireless terminal belonging to the same group also varies at a certain range. By making use of the variation in communication quality and quantity of radio resources over a certain range, more efficient allocation of radio resources is possible. Even if radio resources cannot be assigned to a packet addressed to a certain wireless terminal due to lack of sufficient quantity, those radio resources may be assigned to another packet addressed to another wireless terminal belonging to the same group. In the third embodiment, when radio resources cannot be assigned to a certain packet, they are allocated to another packet in the same group.

Figure 12:
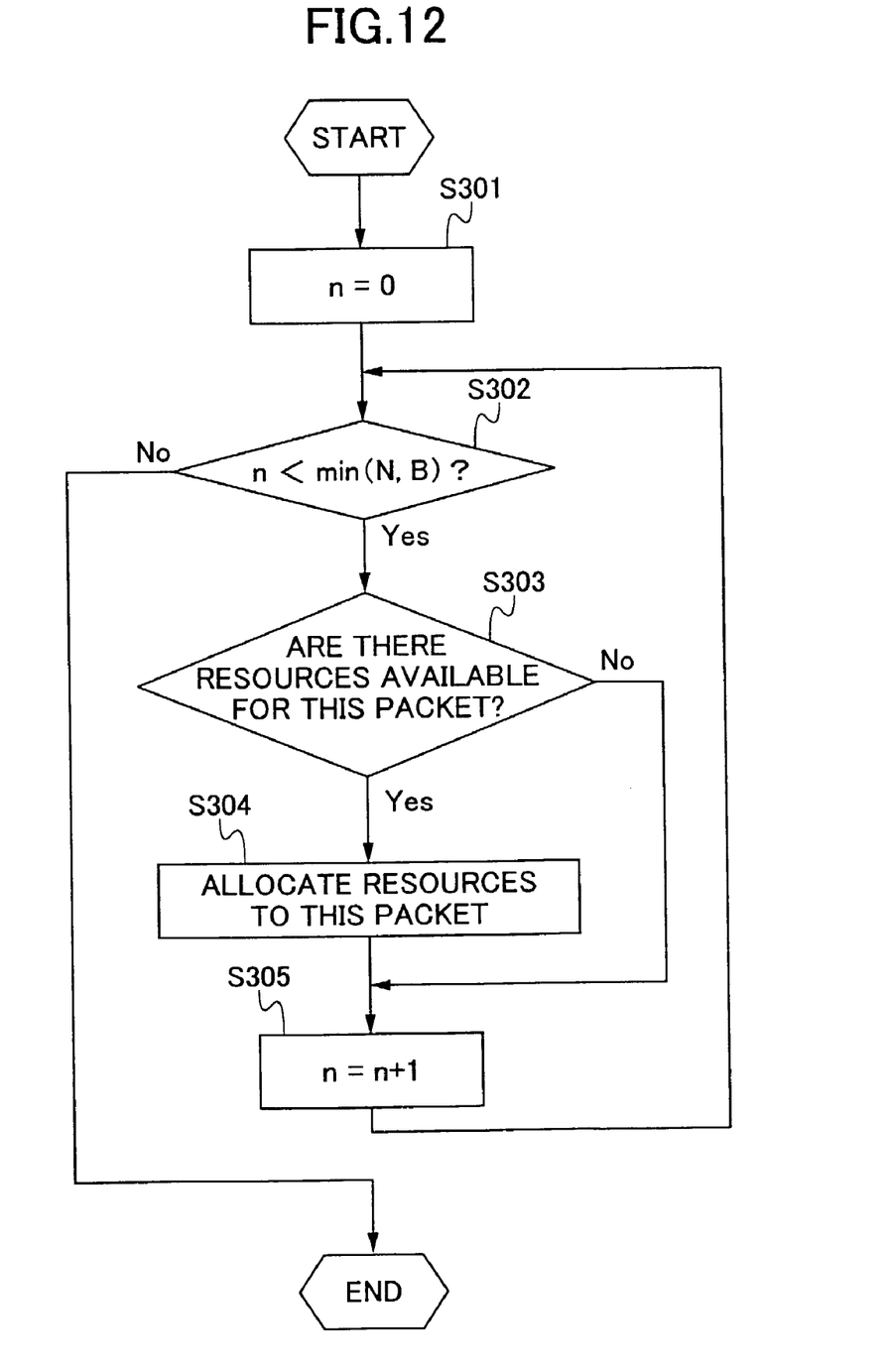
FIG. 12 illustrates the operation flow of allocation of radio resources according to the third embodiment of the invention.

FIG. 12 is a flowchart showing the operations for allocation of radio resources according to the third embodiment. In the flowchart, "n" denotes the number of packets that have been subjected to the determination of whether there are any radio resources available to the packet, "N" denotes the maximum number of packets that can be subjected to the determination, and "B" denotes the number of packet stored in the transmission buffer. The term "min(N, B)" represents whichever is the smaller one between N and B.

The resource allocation unit 113 first sets n=0 in a counter or the built-in memory (not shown) at the beginning of the operation (step S301). Then, the resource allocation unit 113 determines whether the value "n" is smaller than min(N, B) (step S302).

If "n" is smaller than min(N, B) (YES in S302), the resource allocation unit 113 further determines whether there are any radio resources available for the current packet (step S303). If the quantity of radio resources required to transmit the current packet is smaller than the radio resources remaining by subtracting the already allocated radio resources from the maximum radio resources of the base station 1, the resource allocation unit 113 determines that there are radio resources available to the current packet.

If any radio resources are available for the current packet (YES in S303), the resource allocation unit 113 allocates the radio resources to the current packet (step S304). Then, the value of "n" is incremented by 1, and "n+1" is stored as a new value of "n" (step S305). The steps S302 through S305 are repeated for other packets in the transmission buffer until n reaches N or until all the packets stored in the buffer are subjected to the determination.

If it is determined in step S302 that n reaches min(N, B), that is, if all the packets in the buffer have been subjected to the determination or if n reaches N, then the process terminates.

The larger the "N" value, the longer the time the resource allocation unit 113 requires for the operation, and transmission delay may occur. Accordingly, it is preferable to choose the value of "N" taking into account the real-time characteristic of the system or the application. If "N" is set to the number of packets stored in the transmission buffer, the determination is repeated for all the packets in the transmission buffer. If "n" is set to zero (N=0), the resource allocation unit 113 does not conduct the determination whether there are radio resources available to the packet.

In this manner, even if a certain packet cannot receive radio resources due to insufficiency of the radio resources, the radio resources may be allocated to another packet classified in the same group. Accordingly, all the radio resources can be used efficiently.

Although in the above-described embodiments the packets addressed to wireless terminals are classified into two groups based on the communication qualities of the wireless terminals, the invention is equally applied to the case in which the packets are grouped into three or more groups. In addition, the third embodiment can be applied to a case in which packet classification is not conducted. In this case, the determination shown in FIG. 12 is carried out for each transmission buffer.

As has been described above, the communication qualities of wireless terminals are constantly monitored and measured, and packets addressed to the wireless terminals are classified into several groups based on the measured qualities. In the congested state where packets are apt to stay in the base station over the acceptable buffering delay even if the maximum radio resources are used, priority for assigning the radio resources is given to the overstaying packet. This arrangement is effective in preventing transmission delay, while carrying out transmission control in compliance with the service quality required by the wireless terminal to which the packet is addressed.

In the non-congested state, radio resources are first allocated to the packets addressed to wireless terminals having lower communication qualities (that is, the packets requiring a greater quantity of radio resources for transmission), prior to allocating radio resources to the packets addressed to wireless terminals having higher communication qualities (that is, the packets requiring less radio resources for transmission). This arrangement can pull up the total quantity of radio resources that can be allocated to the packets close to the maximum radio resources of the base station. To this end, the radio resources can be used efficiently.

Alternatively, in the non-congested state, radio resources may be first allocated to the packet addressed to wireless terminals having higher communication qualities (that is, the packets requiring less radio resources), prior to allocating radio resources to packets addressed to wireless terminals having lower communication qualities (that is, the packets requiring a greater quantity of radio resources). This arrangement can increases the number of packets that are transmitted, and consequently, the throughput is improved, while efficiently using the radio resources. In addition, it is expected that the communication quality of the wireless terminal that is classified in the lower quality group may be improved before the packet addressed to this wireless terminal is actually transmitted. If the communication quality is improved depending on the communication environment, the radio resources allocated to the packet addressed to this wireless terminal is reduced, and the radio resources are used more efficiently.

This patent application is based on and claims the benefit of the earlier filing date of Japanese patent application No. 2002-060726 filed Mar. 6, 2002, the entire contents of which are hereby incorporated by reference.

What is claimed is:

1. A method for allocating radio resources to a plurality of packets addressed to a plurality of wireless terminals located in an area covered by a base station, comprising the steps of:
    setting a threshold of buffering delay of the packets at the base station based on required service qualities of the wireless terminals;
    monitoring and determining communication qualities of the wireless terminals;
    setting quality ranges for buffered packets based on the monitored communication qualities;
    classifying the packets addressed to the wireless terminals into two or more groups based on the determined communication qualities of the wireless terminals and the quality ranges;
    measuring buffering delay of a leading one of the packets in each of the groups;
    comparing the buffering delay of the leading one of the packets in each of the groups with the threshold; and
    if the buffering delay of the leading one of the packets in one of the groups is at or above the threshold, giving priority for allocating the radio resources to the packets in said one of the groups.

2. The method according to claim 1, further comprising the step of:
    if there is not one of said groups that includes a packet having the buffering delay at or above the threshold, giving priority for allocating the radio resources to packets addressed to the wireless terminals having lower communication qualities.

3. The method according to claim 1, further comprising the step of:
    if there is not one of said groups that includes a packet having the buffering delay at or above the threshold, giving priority for allocating the radio resources to packets addressed to the wireless terminals having higher communication qualities.

4. The method according to any one of claim 1 through 3, further comprising the steps of:
    when allocating the radio resources, determining whether there is a sufficient quantity of radio resources left for a current packet; and
    if the radio resources are insufficient for the current packet, allocating the radio resources to another packet belonging to the same group.

5. The method according to claim 1, further comprising the steps of:
    after allocating the radio resources to the packets belonging to said group that includes the packet having the buffering delay at or above the threshold, determining whether any of the radio resources are still left at the base station; and
    if any of the radio resources are left, allocating the remaining radio resources to the packet belonging to another group.

6. The method according to claim 1, wherein the communication qualities of the wireless terminals indicate transmission power required for the base station to transmit the packet to the wireless terminals, receiving quality at the wireless terminals, receiving error rates at the wireless terminals, throughput of the wireless terminals, or packet loss at the wireless terminals.

7. A base station that allocates radio resources to a plurality of packets addressed to a plurality of wireless terminals in a radio communications system, comprising:
- a buffering delay threshold setting unit that sets a threshold value of buffering delay at the base station based on required service qualities of the wireless terminals;
- a service quality detection unit that monitors and determines communication qualities of the wireless terminals;
- a quality range setting unit that sets quality ranges for buffered packets based on the monitored communication qualities from the service quality detection unit;
- a packet classification unit that classifies the packets into two or more groups based on the determined communication qualities of the wireless terminals and the quality ranges;
- a buffering delay measuring unit that measures buffering delay of a leading one of the packets in each of the groups;
- a transmission priority determination unit configured to compare the buffering delay of the leading one of the packets in each of the groups with the threshold value and if the buffering delay of the leading one of the packets in one of the groups is at or above the threshold value, to give priority for allocating the radio resources to the packets in said one of the groups; and
- a resource allocation unit that allocates the radio resources to the packets in said one of the groups.

8. The base station according to claim 7, wherein if one of said groups has the buffering delay measuring result at or above the threshold value, the transmission priority determination unit gives transmission priority to the packets included in the group with the buffering delay measuring result at or above the threshold value, and the resource allocation unit first allocates the radio resources to the packets included in the group with the buffering delay measuring result at or above the threshold value.

9. The base station according to claim 8, wherein, after the allocation of the radio resources to the packets included in the group with the buffering delay measuring result at or above the threshold value, the resource allocation unit determines whether there are radio resources left at the base station, and if there are remaining radio resources, the resource allocation unit allocates the remaining radio resources to the packets belonging to another of said groups.

10. The base station according to claim 7, wherein if there is not one of said groups with the buffering delay measuring result at or above the threshold value, then the transmission priority determination unit gives transmission priority to the packets included in one of said groups corresponding to a lower communication quality, and the resource allocation unit first allocates the radio resources to the packets included in the group corresponding to the lower communication quality.

11. The base station according to claim 7, wherein if there is not one of said groups with the buffering delay measuring result at or above the threshold value, then the transmission priority determination unit gives transmission priority to the packets included in one of said groups corresponding to a higher communication quality, and the resource allocation unit first allocates the radio resources to the packets included in the group corresponding to the higher communication quality.

12. The base station according to claim 7, wherein the resource allocation unit determines whether there is a sufficient quantity of radio resources available for a current packet, and if the available radio resources are insufficient for the current packet, the resource allocation unit allocates the available radio resources to another packet belonging to the same group.

13. The base station according to claim 7, further comprising a quality range setting unit that determines a range of communication quality for each of said groups based on an average of the measured communication qualities, wherein the packet classification unit classifies the packets based on the range of communication quality determined by the quality range setting unit.

14. The base station according to claim 7, wherein the communication qualities of the wireless terminals indicate transmission power required for the base station to transmit the packet to the wireless terminals, receiving quality at the wireless terminals, receiving error rates at the wireless terminals, throughput of the wireless terminals, or packet loss at the wireless terminals.

* * * * *